Sept. 20, 1927.

O. W. POWELL 1,642,892

CORN HARVESTER

Filed July 10, 1922

Inventor

O. W. Powell

By C.A.Snow & Co.

Attorneys

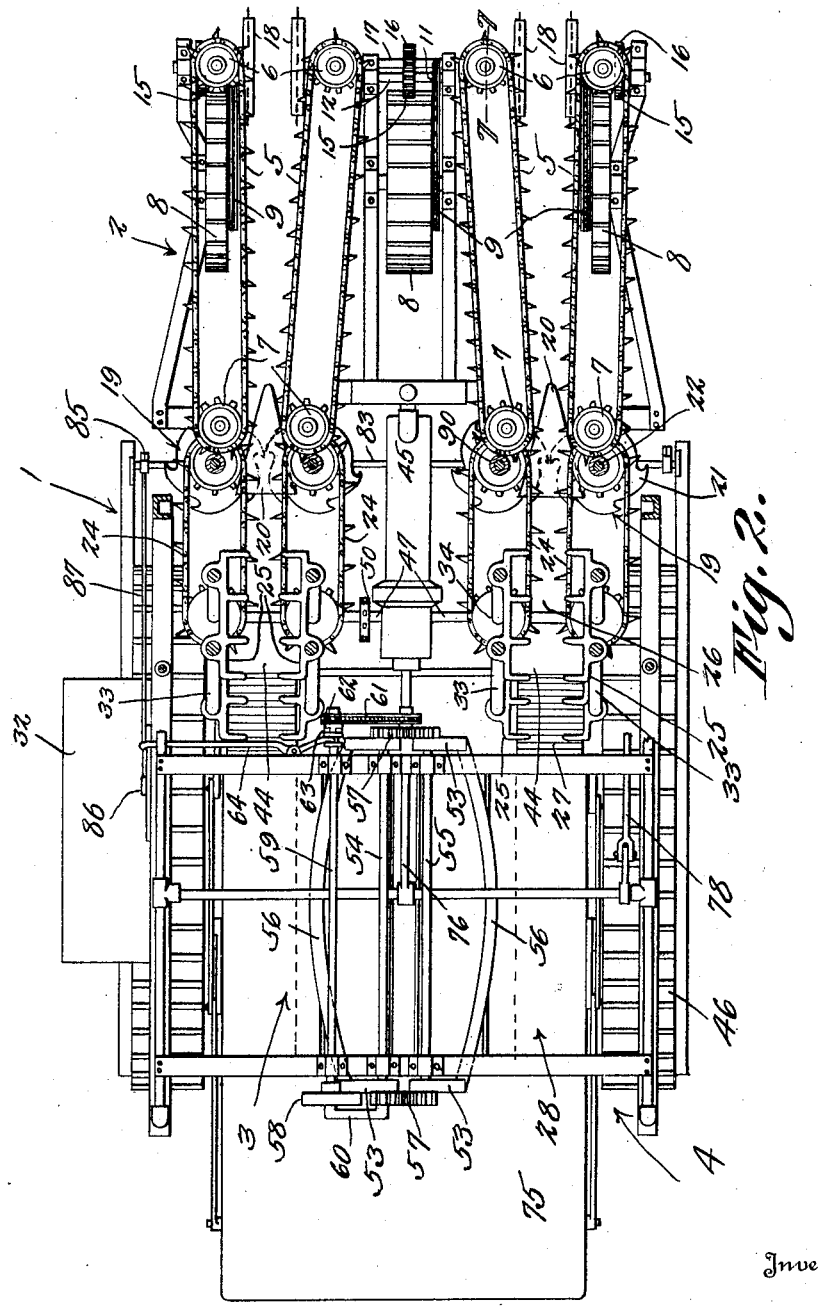

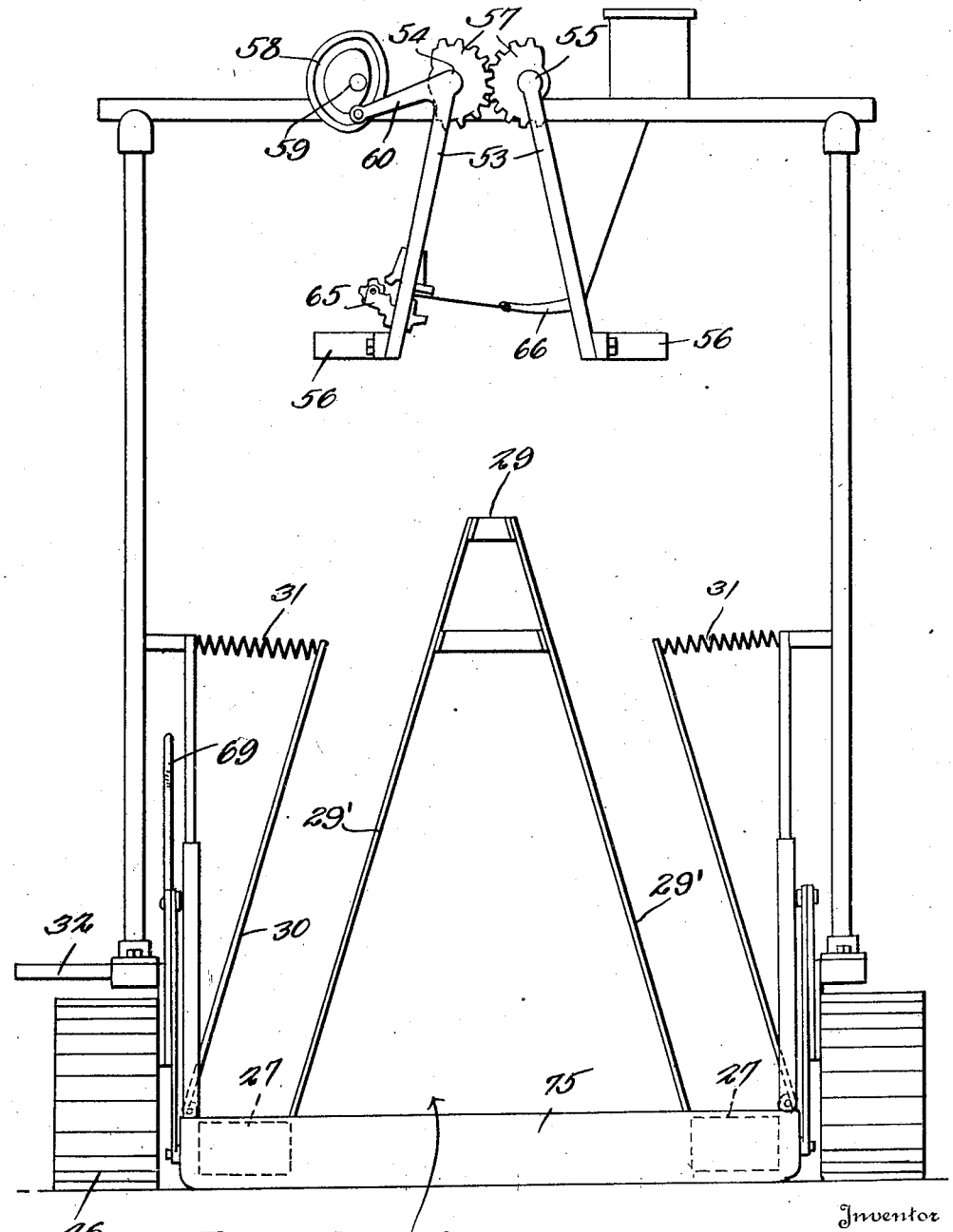

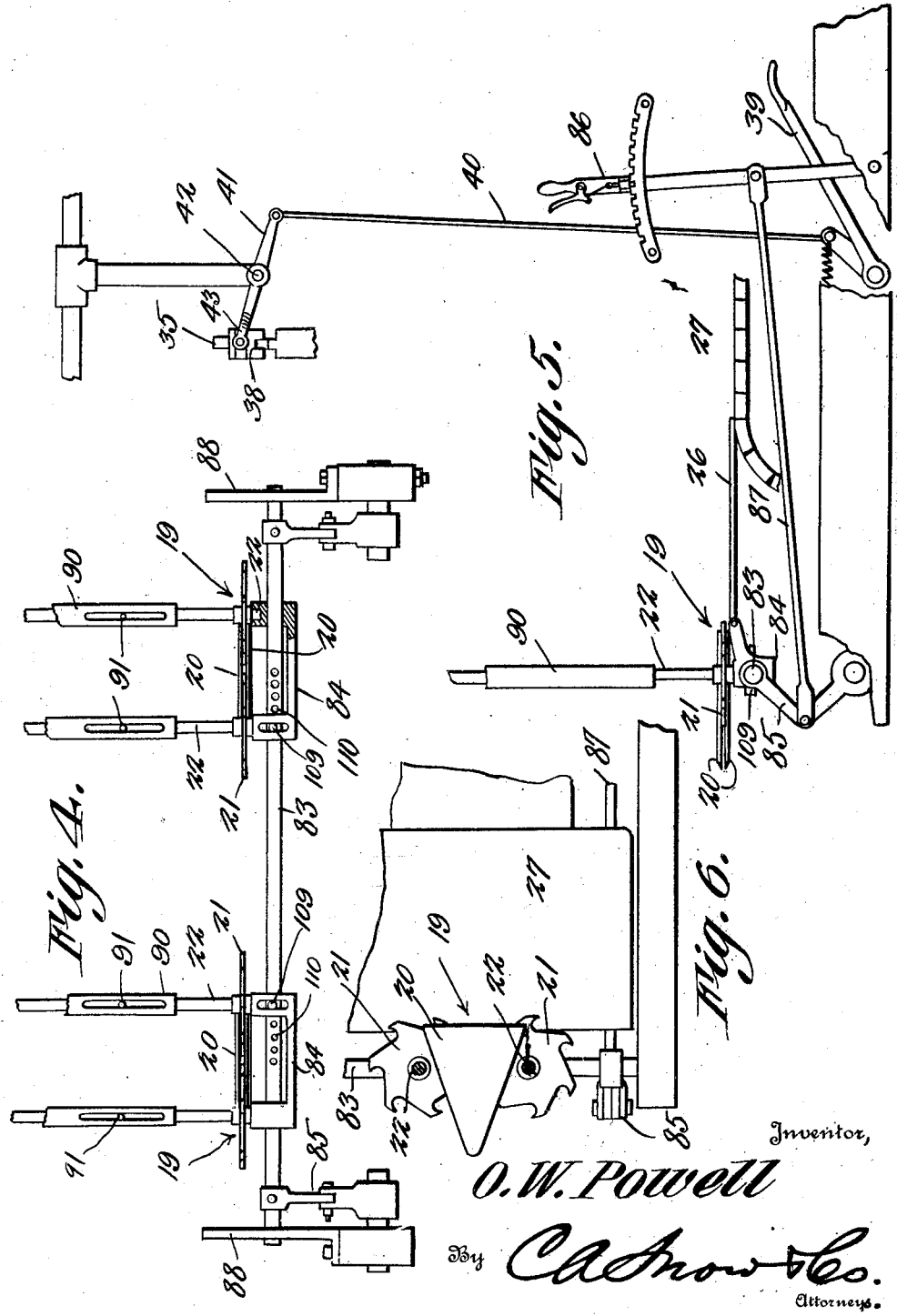

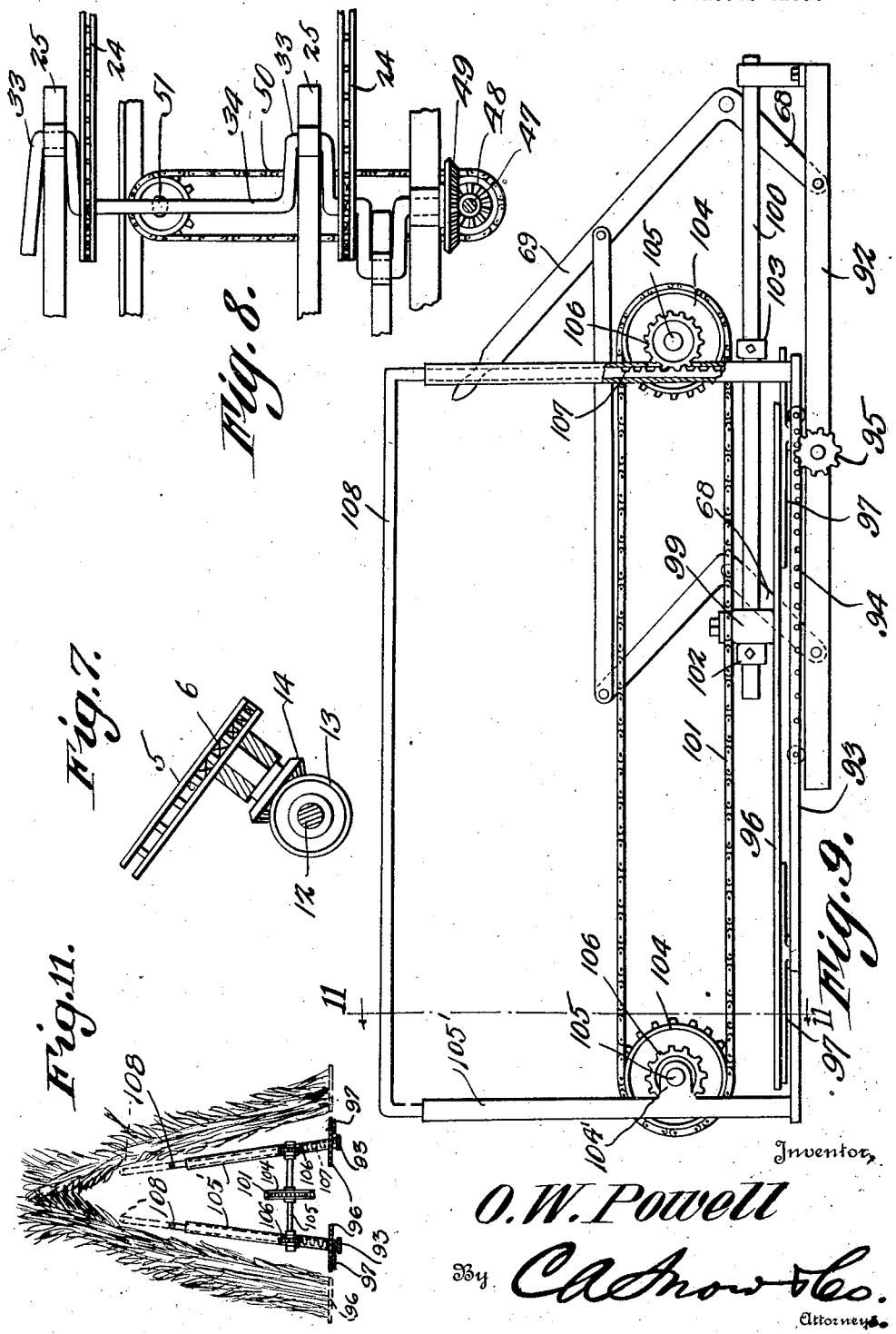

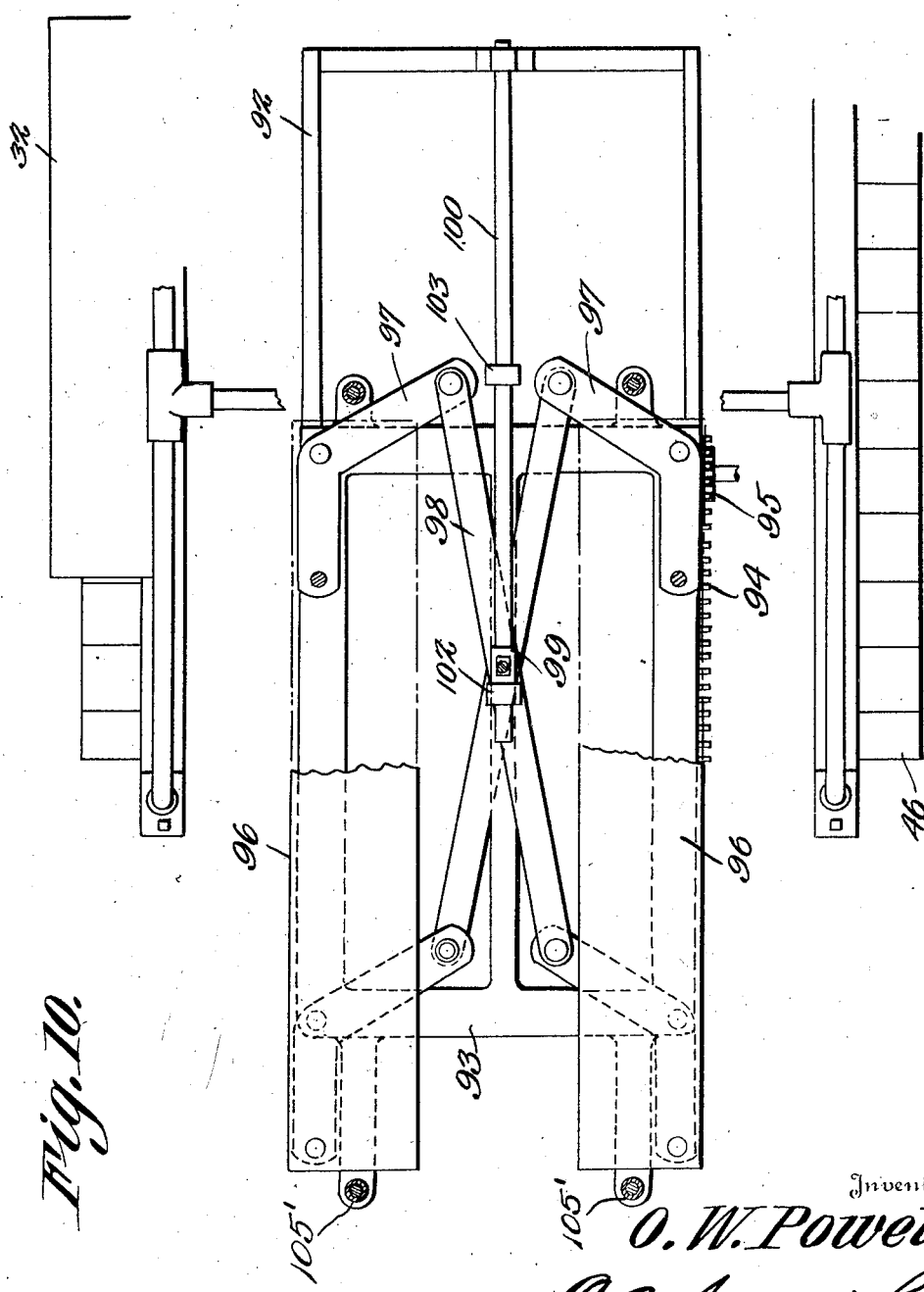

Patented Sept. 20, 1927.

1,642,892

UNITED STATES PATENT OFFICE.

OTIS W. POWELL, OF WASHINGTON COURT HOUSE, OHIO, ASSIGNOR OF ONE-HALF TO EDITH WORTHINGTON, OF WASHINGTON COURT HOUSE, OHIO.

CORN HARVESTER.

Application filed July 10, 1922. Serial No. 573,834.

This invention relates to a corn harvesting machine and has for its object the provision of a machine for simultaneously harvesting two rows of corn, forming the same into a shock, compressing the shock, tying the same and finally discharging the shock from the machine to the ground. The stalks of corn, throughout the operation, remain in an upright position and the shock after being discharged, stands erect with its base extended to afford ample support to maintain the stalks in this position during the curing of the corn.

Other objects will present themselves as the description proceeds, it being within the province of the invention to improve generally and to enhance the utility of machines of the class to which the present disclosure relates. It is to be understood, however, that changes may be made in the machine within the scope of what is claimed without departing from the spirit of the invention or sacrificing any of the advantages thereof.

Figure 2 is a plan view of the machine partly in section.

Figure 3 is a view in rear elevation.

Figure 4 is a detail view of the cutting mechanism.

Figure 5 is a view in side elevation of the structure shown in Figure 4 and associated parts.

Figure 6 is a plan view of a portion of the structure shown in Figure 4.

Figure 7 is a detail section taken on line 7—7 of Figure 2.

Figure 8 is a detail of the feeding structure.

Figure 9 is a view in side elevation with parts in section of a modified form of shock former, and Figure 10 is a plan view partly in section of the structure shown in Figure 9.

Figure 11 is a transverse sectional view taken on line 11—11 of Figure 9.

Figure 1:
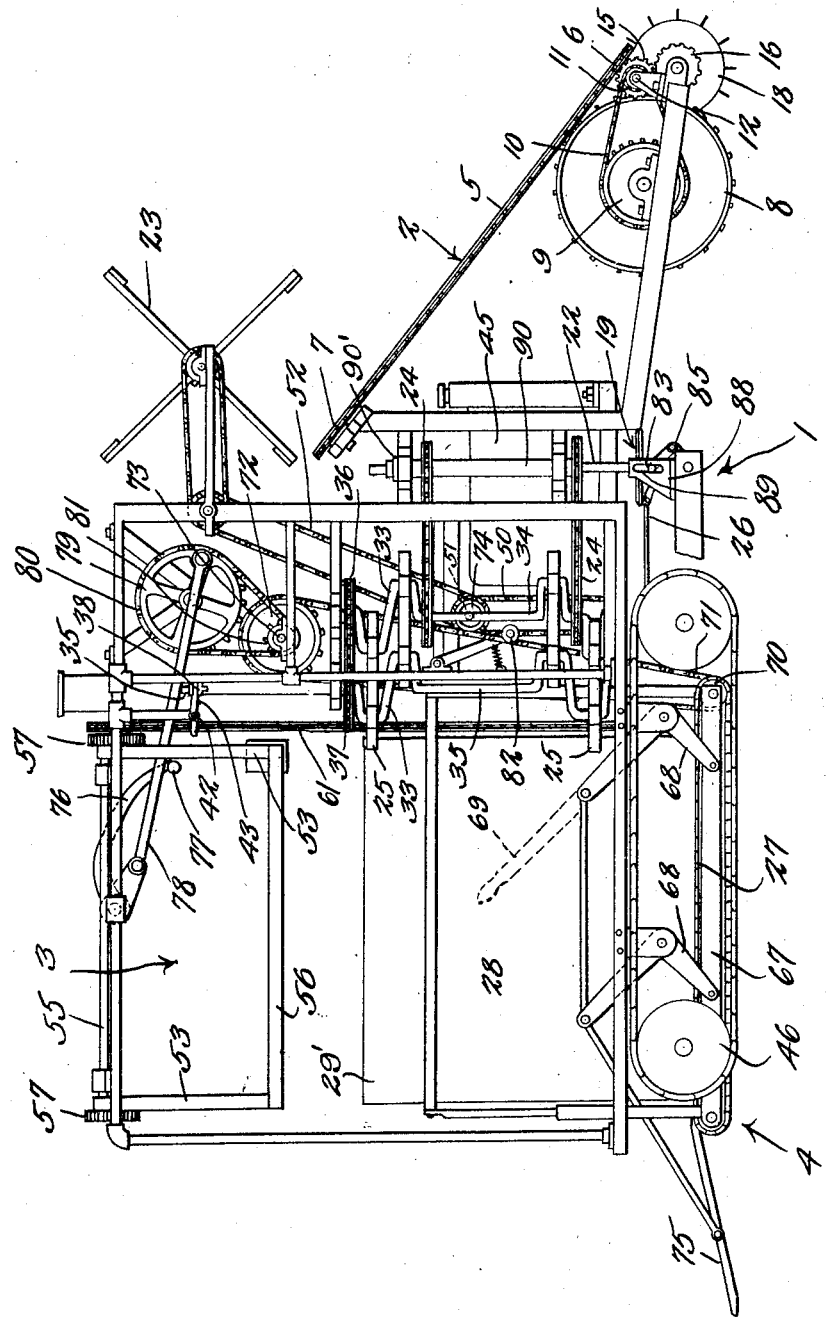
Figure 1 is a view in side elevation of a corn harvester constructed in accordance with the present invention.

Referring to the drawing by characters of reference the numeral 1 designates a frame carrying cutting and gathering mechanism designated generally by the numeral 2. Shock forming and tying mechanism is indicated at 3 and discharge mechanism is shown at 4.

The cutting and gathering mechanism 2 is duplicated on opposite sides of the machine each comprising a chain conveyor 5 driven at one end by a sprocket 6 and passing around an idler sprocket 7 at the other end. Ground wheels 8 are mounted for rotation on the frame and have drive sprockets 9 secured thereto, a chain 10 passing over the said sprocket and over a small sprocket 11 which is fixed to a shaft 12. A bevel gear 13 secured to the shaft 12 meshes with a bevel gear 14 on the shaft to which the sprocket 6 is secured. A spur gear 15 on the shaft 12 meshes with a similar gear 16 on a shaft 17, which shaft carries a pin wheel 18 for engaging and lifting any stalks of corn that may have fallen. It will be seen that as the ground wheel is moved along the rows of corn, motion is transmitted through the gearing just described to actuate chain conveyors 5 and the lifting wheels 18. The conveyors 5 being angularly disposed with relation to the ground line straighten the stalks of corn as it passes into the machine before being cut and delivers it, standing erect, to the cutting device 19.

The cutter 19 comprises stationary pointed blades 20 having opposite cutting edges, and rotary knives 21 which are mounted on shafts 22. The knives 21 coact with the blades 20 to sever the stalks a predetermined distance above the ground. A reel 23 operates above the conveyor 5, at the upper end thereof, to move the top of the stalks into the gathering device.

Parallel chain conveyors 24, horizontally disposed, move the stalks from the cutters rearwardly to be engaged by packers 25, the stalks traveling over the table 26 during this movement and being deposited on a movable apron 27 into the shock former 28. The conveyor 27 forms the bottom for the shock former which includes an inverted V shaped member 29 which forms a core for the shock, said core having inclined side walls 29′, the lower edges of which terminate adjacent the inner edges of the movable aprons 27. Near the outer edges of the aprons 27 are hingedly connected the outer wall members 30 of the shock former. The said walls are spring pressed as shown at 31 toward the inclined side walls 29′ of the shock former.

When enough corn to form a shock is packed into the shock former by the members 25 an operator standing on a platform 32 manipulates certain levers, yet to be described, whereupon movement of corn stalks to the shock former is stopped, the shock is compressed and bound and then discharged from the machine.

The feeders 25 are mounted on cranks 33 formed on shaft 34 and 35. A sprocket 36 is fixed to the shaft 34 and is connected by means of a sprocket chain to a sprocket 37 of equal size, loosely mounted on the shaft 35. A clutch 38 is provided for each of the shafts 35 and sprockets 37, the clutches being operable from the platform 32 by means of a foot lever 39 mounted on the platform. A rod 40 connects the lever 39 with a lever 41 attached to a rock shaft 42 to which latter is connected a yoke 43 for each of the clutches.

By disengaging the clutches by means of the mechanism just described gyration of the rear end of the feeding members 25 may be stopped and delivery of corn to the shock former temporarily suspended, the corn that is cut during the stoppage of the feeders being moved rearwardly from the cutting knives by the forward end of the feeders which continue to gyrate and being supported on a platform 44 by the temporary non-feeding end of the feeders. The corn accumulates at this point until the operator again connects the clutches 38, whereupon feeding to the shock former is resumed.

A prime mover 45 furnishes power to drive the various operative parts as well to propel the tractor 46 on which the machine is mounted. A transverse shaft 47 driven from the engine has fixed thereto bevel gears 48 which mesh with bevel gears 49 located on the shafts 34, which operate the feeders.

A sprocket chain 50 driven from the shaft 47 transmits motion to a shaft 51 on which is mounted a sprocket and chain 52 for driving the reel 23.

The tying mechanism includes two pair of arms 53 secured to parallel shafts 54 and 55, the arms being above and at opposite ends of the shock former, and a bar 56 which connects the lower ends of the arms of each respective shaft. Segmental gears 57 are secured to each of the shafts 54 and 55 for transmitting an oscillatory movement from one shaft to the other and thereby to cause the bars 56 to be swung inwardly to compress the shock. A cam 58 mounted on a shaft 59 operates through an arm 60 to oscillate the shaft 54.

A chain 61 driven from the engine passes over a sprocket 62 loosely mounted on the shaft 59, and a clutch 63 splined to the shaft and slidable thereon may be connected to the sprocket 62 at the will of an operator by means of a lever 64. A knotter 65 and needle 66 conventionally shown, such as illustrated in the Patent No. 315,091 issued to G. Tyler on April 7, 1885, are attached to the swinging arms 53 whereby twine will be tied about the top of the shock to hold the stalks together.

The traveling aprons 27 hereinbefore referred to are mounted on a movable frame 67, the frame being supported for vertical movement on arms 68 of bell-crank levers, and are adapted to be moved to an elevated position for reception of the corn by means of a hand lever 69 accessible to the operator on the platform 32 to be lowered thereby to the position shown in Figure 1 for discharge of the finished shock. A sprocket 70 attached to the roller at one end of the traveling apron 27 has trained thereabout a sprocket chain 71 which passes over a sprocket 72 on a shaft 73. When the platform is lowered as shown in the drawing one lead of the chain 71 is caused to engage a drive sprocket 74 fixed to the shaft 51 thus rotating the sprocket 70 and causing the apron to move rearwardly carrying the base of the shock therewith, the shock moving over an inclined tailboard 75 to the ground. Simultaneously with this movement of the base of the shock, the top of the same is moved off the machine by means of an arm 76 carrying a transverse pusher bar 77, the arm being pivoted on the frame and operated through the arc of a circle by means of a pitman 78. A sprocket wheel 79 to which the pitman is connected is operated from the shaft 73 through a chain 80 passing over the sprocket 79 and a sprocket 81 on the shaft 73. The size of the sprockets 70, 72, 79 and 81 are so proportioned that a complete revolution of the wheel 79 will be effected during the movement of the apron 27 in discharging a shock which movement is approximately equivalent to the length of the shock former. Upon the completion of a single rotation of the sprocket 79 the operator moves the lever 69 to a position to elevate the apron 27, which allows the chain 71 to slacken and be moved by a spring actuated roller 82 from engagement with its drive sprocket 74. The shock forming and tying mechanism is then ready for another shock. The operator now moves the clutch 38 into engagement and the feeders 25 resume their function of delivering stalks to the shock former.

Means for vertical adjustment of the cutting mechanism 19 comprises a bar 83 on which frames 84 are mounted. The lower ends of the shafts 22 are journaled in the frame 84. Toggles 85 are operated from the platform 32 by means of a lever 86, which is connected to one of the toggles by a rod 87. Plates 88 carried by the frame of the machine have the ends of bar 83 mounted therein, and a slot 89 in said plate guides the bar in a vertical direction. The shaft 22 telescopes within a sleeve 90 with which the front sprocket of the conveyor chain 24 rotates. A slot and pin connection 91 between the shaft 22 and sleeve 90 permits vertical adjustment of the cutters at the same time causing said members to rotate together. A collar 90' secured to the sleeve 90 rests on the bearing for said sleeve and prevents the sleeve from sliding downwardly on the shaft 22.

Figures 9 and 10 show a modified form of discharge mechanism in which a frame 92 is mounted on the arms 68, for vertical movement. A longitudinally movable frame 93 is mounted on the frame 92, it being moved rearwardly on the frame 92 by means of a rack 94 and pinion 95, the pinion being driven similarly to the pinion 70 as by means of the chain 71 and may be manually returned to loading position after the shock has been discharged.

A platform 96 located at each side of the frame 93 serves the purpose of the traveling aprons 27 heretofore described.

In Figures 9 and 10 the platforms are shown in a position immediately after discharge of a shock. When the platforms have been moved to the loading position, the stalks of corn are deposited thereon in the same manner as heretofore described. Mechanism for discharging the shock include bell crank levers 97 which are fulcrumed on the movable frame 93. One arm of each of said levers is connected to the boards 96, the other arm being connected through toggle arms 98 to a block 99 slidably mounted on a rod 100. The rod 100 is secured to the frame 92 and is provided with adjustable stop collars 102, 103 against which the block 99 abuts in its back and forth movement on the rod 100, as the platform is moved from loading to discharge positions.

The block 99 is connected to a chain 101 which is trained over sprocket wheels 104 mounted on shafts 105, the shafts being carried by brackets 104' formed on hollow standards 105' which are mounted on the frame 93. Gears 106 secured to the shafts 105, engage rack bars 107 slidable in the hollow standards 105'. The racks project from the upper end of the standards 105' and are connected by longitudinal bars 108, said bars forming a core member corresponding to the core member 29 heretofore described. As hereinbefore stated the shock former illustrated in Figures 9 and 10 is shown in the position it assumes in discharging a shock, that is with the frame 93 moved to the rear of the frame 92 through the instrumentality of the rack 94 and gear 95.

Engagement of the block 99 with the collar 102 causes the platforms 96 to be withdrawn from under the shock to the position shown in Figure 10. It will also be observed that after the block 99 is arrested in its movement rearwardly on the rod 100 by the stop 102 further movement of the frame 93 causes the shafts 105 to be rotated through the chain 101 and sprockets 104 thus rotating the gears 106 and lowering the rack 107 and bar 108 to the position shown in Figure 9, out of engagement with the shock. When the frame 93 is returned to loading position and the block 99 contacts with the stop 103 the action above described is reversed, the platforms 96 are extended and the bars 108 elevated to shock receiving position. It will here be noted that the standards 105' are located inside the shock, that is between the two legs of the shock and after the shock is deposited on the ground the standards move with the frame 93 forwardly from between the said legs.

Means for adjusting the cutting mechanism for rows of different widths is shown in Figure 4. A pin 109 passing through a slot in the frame 84 may be inserted into any one of a number of holes 110 in the bar 83, and in this way the cutters may be moved to greater or less distance apart.

Having thus described the invention what is claimed is:

1. In a corn harvesting machine; means for cutting the stalks; gathering means comprising a lifting wheel, a ground wheel for driving the lifting wheel, gearing interposed between the ground wheel and the lifting wheel for reversing the direction of travel of the lifting wheel from that of the ground wheel and a conveyor inclined rearwardly and upwardly from the lifting wheel; a shock former; mechanism for carrying the cut stalks from the cutting mechanism to the shock former and means for delivering the formed shock to the ground in a standing position.

2. In a corn harvesting machine, cutting mechanism comprising a rotatable cutting blade; means for rotating the cutting blade; a fixed cutting blade adjacent the first mentioned blade, a bar on which the blades are mounted, said bar being vertically adjustable, toggles connected to the bar to effect said vertical adjustment, and means for moving the toggles whereby the cutting mechanism may be raised or lowered at the will of an operator; a shock former for receiving the corn; means for moving the cut stalks from the cutting mechanism to the shock former and means for delivering the shock to the ground in a standing position.

3. In a corn harvesting machine, cutting mechanism; shock forming mechanism; mechanism for moving the cut stalks from the cutting mechanism to the shock forming mechanism; discharge mechanism including a movable base member, for support of the shock and a pusher adapted to discharge the upper portion of the shock; and means for simultaneously moving the base member and the pusher to discharge the shock.

4. In a corn harvesting machine, cutting mechanism, shock forming mechanism including a movable base member for support of the shock, means for carrying the cut stalks from the cutting mechanism to the shock forming mechanism; a pusher comprising a swinging arm mounted above the shock and a pitman for moving the arm through an arc of a circle; and gearing between the base member and the pusher for simultaneously moving the said members to discharge the shock.

5. A corn harvesting machine comprising a frame; a shock former mounted on the frame, the shock former including a rigid inclined core member and outer side walls the side walls being inclined approximately parallel with the wall of the core member; hinged connections between the outer side walls and the frame; resilient means tending to urge the side walls toward the core member; means for cutting the corn and delivering it to the shock former and means for ejecting the shock from the shock former.

6. A corn harvesting machine comprising a frame; cutting mechanism mounted on the frame; a shock former carried by the frame mechanism for moving the cut stalks from the cutting mechanism to the shock former; means for compressing the corn in the shock former, said means including a pair of oscillating shafts, gear segments connecting the shafts, an arm secured to one of the shafts, a cam for actuating the arm to oscillate the shaft, means for intermittently rotating the cam, and members connected to the shafts for compressing the shock; binding means carried by the compressing means and means for discharging the shock from the machine.

7. A corn harvesting machine including a frame; a prime mover mounted on the frame, mechanism for cutting corn, mechanism connecting the prime mover and the cutting mechanism; a shock former carried by the frame; feeders for moving the corn from the cutting mechanism to the shock former; gearing connecting the prime mover with the feeders; means for discharging the shock from the shock former and means under the control of an operator for suspending movement of the feeders during the discharge of the shock.

8. A corn harvesting machine comprising corn cutting mechanism; means for forming a shock including an inverted V shaped core and resilient side walls spaced from the core; a bottom for the shock former, mechanism for moving the bottom vertically; mechanism for moving the bottom longitudinally; and means for discharging the shock from the shock former.

9. A corn harvesting machine comprising cutting mechanism; gathering mechanism; shock forming mechanism including a shock former and a bottom for the shock former means for supporting the bottom for vertical movement and for longitudinal movement; discharge mechanism for the upper portion of the shock; manually operated means for effecting vertical movement of the bottom; means for imparting movement to the discharge mechanism; means for imparting longitudinal movement to the bottom and means responsive to the vertical movement of the bottom for producing, simultaneously, longitudinal movement of the bottom and movement of the discharge mechanism.

In testimony that I claim the foregoing as my own, I have hereto affixed my signature.

OTIS W. POWELL.